H. Halvorson,
Truss.

N° 4,987. Patented Feb. 27, 1847.

UNITED STATES PATENT OFFICE.

HALVOR HALVORSON, OF LEICESTER, MASSACHUSETTS, ASSIGNOR TO TIMOTHY EARLE.

TRUSS.

Specification of Letters Patent No. 4,987, dated February 27, 1847.

To all whom it may concern:

Be it known that I, HALVOR HALVORSON, late of Norway, but now residing in Leicester, in the county of Worcester and State of Massachusetts, have invented a new and useful Improvement in Trusses for the Reduction or Alleviation of Hernia; and I do hereby declare that the same is fully described and represented in the following specification and accompanying drawings, and letters, figures, and references thereof.

Figure 2:
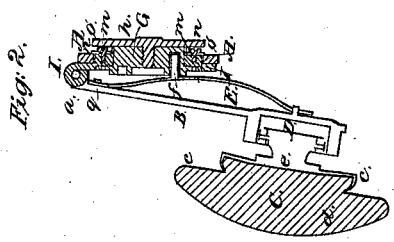
Figure 3:
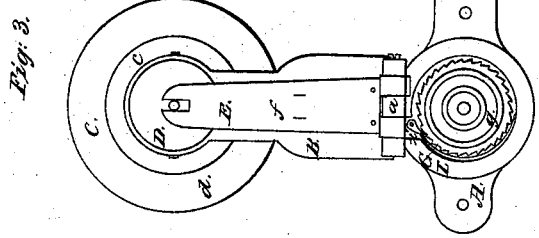
Figure 1:
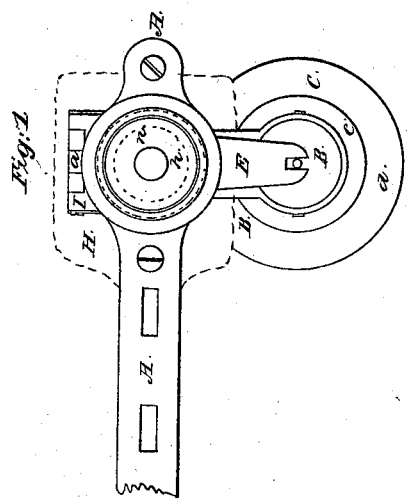

Of the said drawings, Figure 1 denotes a front view of my improved truss. Fig. 2 is a vertical and transverse section of it, taken through the bearer or what is usually termed the pad. Fig. 3 is a view of the rear side of that end of the main spring to which the bearer, and its arm are applied; the said bearer and arm being exhibited as turned upward.

As trusses have heretofore been constructed, they have had their pads or bearers, or those parts of them, which were to rest in contact with the body of a person, made of some animal or vegetable material or materials, easily affected by the moisture or perspiration of the body, and at the same time bad conductors of heat. The absorbent and nonconducting properties of such pads, soon render them offensive as well as injurious to the wearers. They not only heat the parts to which they are applied, but soon either produce greater irritation, or callous thereon. These difficulties have led me to the employment of a material which completely obviates them, and which I shall now proceed to describe.

In the drawings A represents one end of a part of the main spring which usually extends around the body and is covered or protected by leather or some other proper substance.

Figure 4:
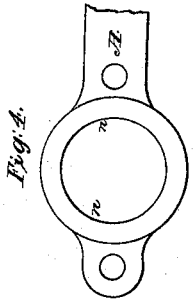

B is an arm of metal, hinged to what I term the rotating axis plate I at its top part, as seen at $a$, in the drawings. The said plate I is circular in form, and has a short cylindrical journal $m, m$, extending from it, and through a corresponding circular aperture $n, n$, made through the main spring A, as seen in Fig. 4, which represents the end of the main spring, as it appears before the rotating axis plate is applied to it. The plate I is held in place within the aperture $n, n$, by means of a flat circular ring $o, o$, which is screwed to the plate I, and projects beyond the aperture $n, n$, as seen in Fig. 2.

The said flat circular ring is shown at $n$ Fig. 1.

Figure 5:

By the above mode of constructing and applying the axis plate to the main spring A, it will readily be seen that the axis plate may be moved or turned around upon the main spring, its journal $m, m$, revolving or turning in the aperture $n, n$, of the main spring. Fig. 5 denotes a section of the axis plate and main spring as they would appear without the addition of the ratchet cam wheel G, to be hereinafter described. In this figure it will be seen that a circular aperture $p$, is made through the journal $m, m$, and plate I, and terminates in an enlarged circular space $q$, as seen in the drawings. The said arm B depends from the plate I, and has the pad or bearer C, connected to its lower end by a universal joint D, or such a joint or contrivance as will allow the bearer to accommodate itself to the various and ordinary movements of the body, as well as those of the abdomen. The said bearer C consists of a metallic plate or cup $c$, and a glass plano-convex lens or face $d$, secured within or to it, by cement or in any other proper manner. In construction it very much resembles the common glass knob for doors. The said cup plate or socket $c$, has a shank $e$, projecting backward from its central part, and jointed to the lower part of the arm B by the universal joint, as before mentioned. The exterior or convex surface of the glass part $d$, should be polished perfectly smooth wherever it is to rest in contact with the body. Instead of glass, crystallized quartz or other hard mineral substance susceptible of a fine polish, or of having a very smooth surface made upon it, may be employed; but as glass is probably the cheapest, and one of the best conductors of heat, besides being the most convenient material in its application, I prefer it to any other.

The glass bearer always retains its shape. It is a non-absorbent of the perspiration, as well as a good conductor of heat. Its properties render it not only exceedingly pleasant and comfortable to the wearer, but also a preventative of external inflammation and its consequences; as well as a great curative of internal inflammation, the said curative powers resulting from the facility with which it operates to conduct away the superfluous heat of the diseased parts.

A steel spring E is secured to the arm B;

between it and the axis plate I, as seen in the drawings, a projection or stud $f$, extends from the spring, and enters a circular cam groove or inclined plane $g$, made in the side of a revolving ratchet cam wheel G, as seen in Fig. 3. The said groove commences at the surface of the side of the ratchet cam wheel and regularly increases in depth until it terminates at the point of commencement. In other words it is a helical inclined plane.

Figure 6:
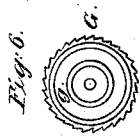

The ratchet wheel, (a side view of which is exhibited in Fig. 6), has a milled nut $h$, secured to it for the purpose of revolving or turning it around, and of confining it within the space $p$, of the journal of the axis plate I: the said nut being made to project from the outer side of the main spring, while the teeth of the ratchet wheel are on the inner side of the plate I, the cam wheel G being adapted to so as to revolve in the aperture $p$. A small spring catch or pawl $i$ is secured at one end to the inner side of the axis plate I, and rests in or engages with at its other end the teeth of the ratchet wheel.

If we suppose the projection $f$, to be in the deepest part of the circular groove $g$, and we turn the ratchet wheel in a direction so as to cause the projection to mount or ascend the inclined plane of the groove, we shall thus cause the arm B and the bearer C, to advance toward the body. We can thus increase, diminish or regulate the pressure of the glass face of the bearer C, upon the abdomen, by simply applying the hand to the milled nut $h$, and rotating the ratchet wheel. The said ratchet wheel and milled nut should be applied to the axis plate I; in any manner by which they may be made to always retain their places and be revolved in conjunction; all of which will be well understood by truss manufacturers or mechanicians.

A cushion H is secured to the mainspring, and interposed between the arm B, and the body of the wearer of the truss, the object of the said cushion being to protect the body from injury.

By means of the axis plate I, the bearer C, may be readily adjusted to any required position upon the body. It also enables the truss to be used not only on either groin for the cure of inguinal hernia, but also upon or in the immediate vicinity of the navel, for the cure of umbilical hernia. The situation of the milled nut $h$, admits of the regulation of the pressure of the bearer C, upon the body, without the necessity of removing the truss therefrom; this being the peculiar advantage derived from the peculiar apparatus for regulating the said pressure of the bearer.

I claim—

1. The mode of regulating the pressure of the bearer C upon the surface of the abdomen, viz. by the revolving ratchet cam wheel G (as applied to the main spring) in combination with the stud ($f$,) and spring (E) of the arm (B) which is jointed to the main spring, and sustains the glass bearer in position.

2. I do not claim the application of the glass bearer C, to the main arm B of the main spring A in such manner that it may be adjusted at different angles thereto; but that which I do claim is my particular mode of effecting the same, so as at the same time to allow of the correct operation of my peculiar apparatus by which the pressure of the bearer is regulated; that is to say I claim the rotating axis plate (I) as combined with the main spring (A) and arm (B) and ratchet cam wheel (G), and operating substantially as above specified.

In testimony whereof I have hereto set my signature this second day of September in the year A. D. 1846.

HALVOR HALVORSON.

Witnesses:
JAMES NEWTON,
HENRY GRUTON.